US011999500B2

(12) United States Patent
Balepin et al.

(10) Patent No.: US 11,999,500 B2
(45) Date of Patent: Jun. 4, 2024

(54) DEPLOYABLE INLET ASSEMBLY FOR AERIAL VEHICLE

(71) Applicant: GENERAL ELECTRIC COMPANY, Schenectady, NY (US)

(72) Inventors: Vladimir Balepin, Manorville, NY (US); Fabian Chacon, Ronkonkoma, NY (US); Dean P. Modroukas, Scarsdale, NY (US); Neal Rosenblum, Wilton Manors, FL (US); William Henderson, Plainview, NY (US); Samuel G. Cavas, New York, NY (US); Patrick M. Drennan, Babylon, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 191 days.

(21) Appl. No.: 17/506,107

(22) Filed: Oct. 20, 2021

(65) Prior Publication Data
US 2023/0123752 A1 Apr. 20, 2023

(51) Int. Cl.
*B64D 33/02* (2006.01)
(52) U.S. Cl.
CPC .................... *B64D 33/02* (2013.01)
(58) Field of Classification Search
CPC .................................................... B64D 33/02
See application file for complete search history.

(56) References Cited

U.S. PATENT DOCUMENTS

| | | | | | |
|---|---|---|---|---|---|
| 3,173,249 | A | * | 3/1965 | Wiggins | F02K 7/18 60/39.47 |
| 3,482,403 | A | * | 12/1969 | Polk, Jr. | F02K 7/18 60/245 |
| 3,659,424 | A | * | 5/1972 | Polk, Jr. | B64D 33/02 60/245 |
| 3,844,118 | A | | 10/1974 | Wilkinson | |
| 3,998,050 | A | | 12/1976 | Curran | |
| 4,049,199 | A | * | 9/1977 | Nightingale | F02K 1/1261 239/265.39 |
| 4,185,373 | A | * | 1/1980 | Holland | F42B 15/00 29/423 |
| 4,327,886 | A | * | 5/1982 | Bell | F42B 10/64 60/245 |
| 4,655,413 | A | * | 4/1987 | Genssler | F02C 7/042 137/15.1 |

(Continued)

*Primary Examiner* — Lorne E Meade
(74) *Attorney, Agent, or Firm* — Carter, DeLuca & Farrell, LLP; George Likourezos

(57) ABSTRACT

An aerial vehicle includes a housing, a propulsion system supported within the housing, and an inlet assembly supported by an outer surface of the housing. The inlet assembly includes: at least one fluid channel in fluid communication with the propulsion system; and a first scoop coupled to the housing and movable between a stowed position and a deployed position. The first scoop is aligned with the housing in the stowed position to prevent air from entering the propulsion system, and the first scoop projects from the outer surface of the housing in the deployed position to direct air through the at least one fluid channel and into the propulsion system to generate thrust. The inlet assembly includes a flap disposed upstream of the first scoop. The flap is moveable between a flap stowed position and a flap deployed position.

20 Claims, 13 Drawing Sheets

(56) References Cited

U.S. PATENT DOCUMENTS

| | | | | |
|---|---|---|---|---|
| 6,142,417 | A | 11/2000 | Figge, Sr. | |
| 6,264,137 | B1 * | 7/2001 | Sheoran | B64D 41/00 |
| | | | | 55/306 |
| 6,584,764 | B2 * | 7/2003 | Baker | F02K 7/06 |
| | | | | 137/15.1 |
| 7,014,144 | B2 * | 3/2006 | Hein | F02C 7/045 |
| | | | | 244/53 B |
| 7,624,944 | B2 * | 12/2009 | Parikh | B64D 13/06 |
| | | | | 137/15.1 |
| 7,665,694 | B2 * | 2/2010 | Hein | F02C 7/045 |
| | | | | 244/129.5 |
| 7,861,968 | B2 * | 1/2011 | Parikh | B64D 33/08 |
| | | | | 137/15.1 |
| 8,109,464 | B2 * | 2/2012 | Bhargava | B64D 41/00 |
| | | | | 244/50 |
| 8,196,861 | B2 * | 6/2012 | Cazals | B64D 41/00 |
| | | | | 244/58 |
| 9,726,035 | B2 * | 8/2017 | Ratke | F02D 41/0007 |
| 9,957,060 | B2 | 5/2018 | Riordan | |
| 11,555,448 | B2 * | 1/2023 | Casado-Montero | B64C 21/08 |
| 2013/0181088 | A1 * | 7/2013 | Casado Montero | B64C 25/405 |
| | | | | 244/50 |

\* cited by examiner

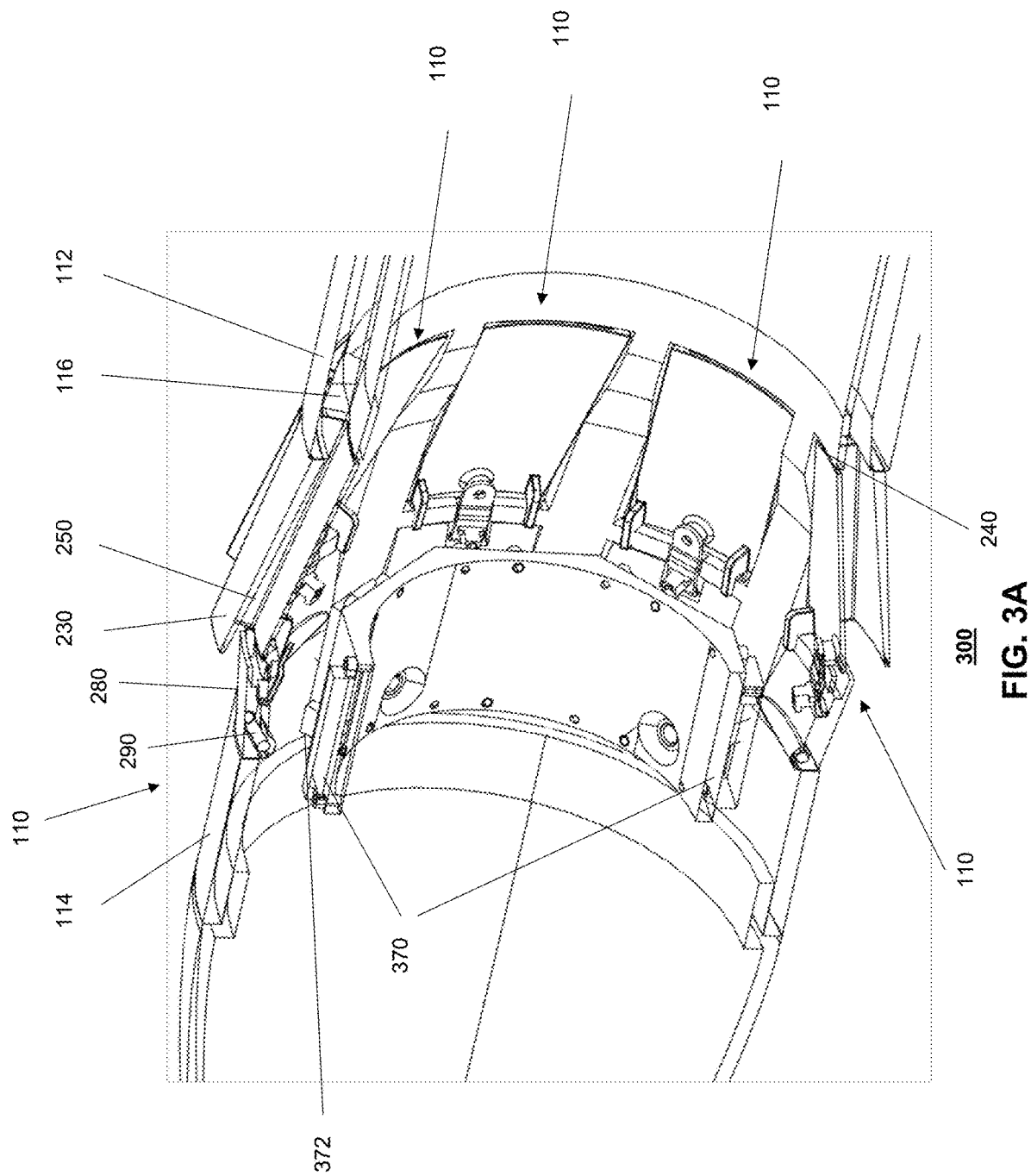

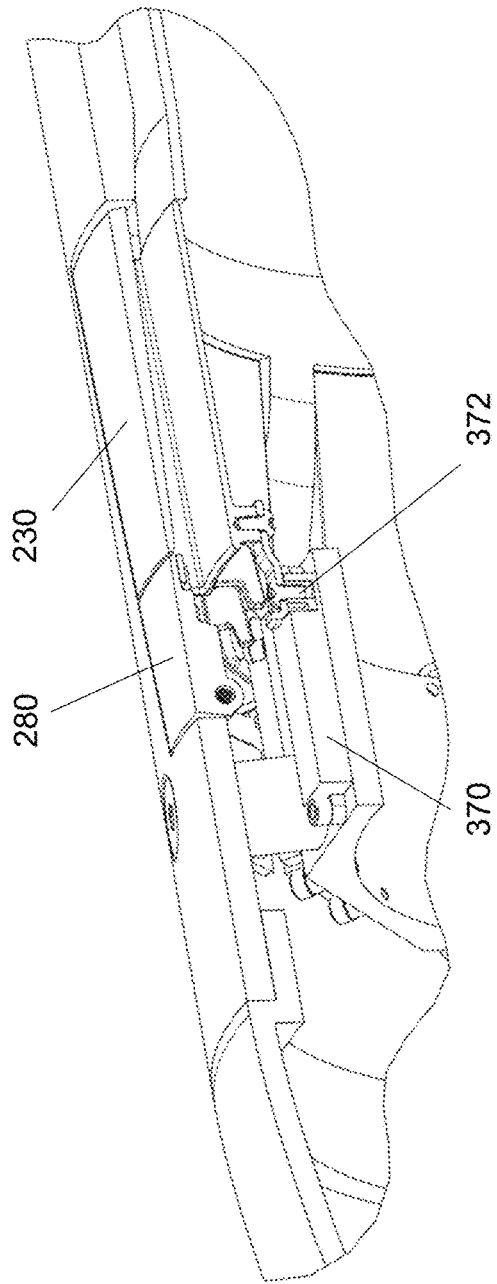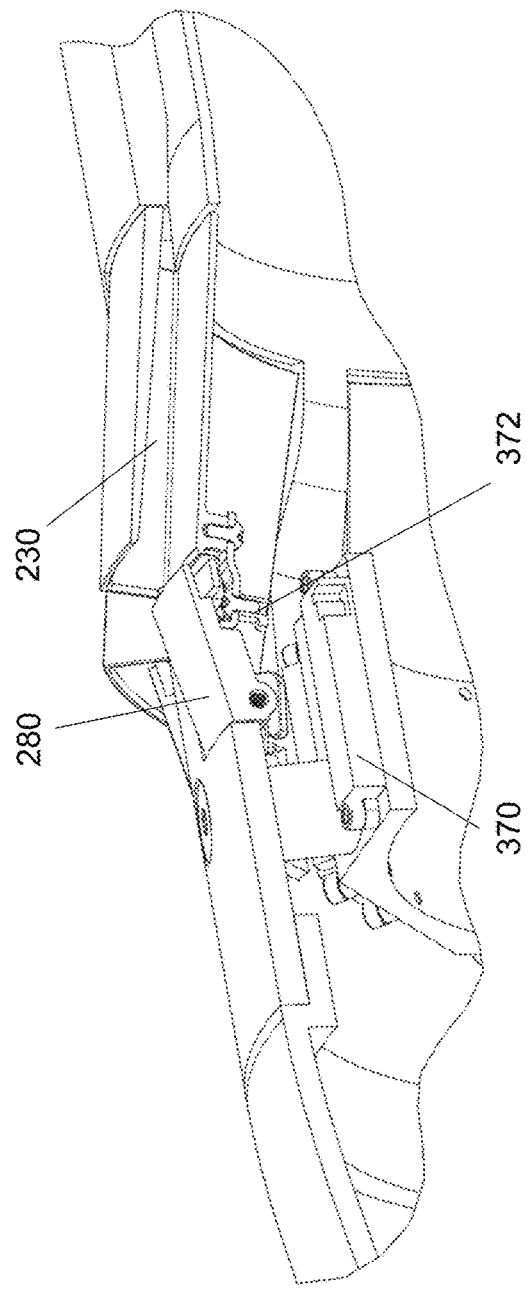

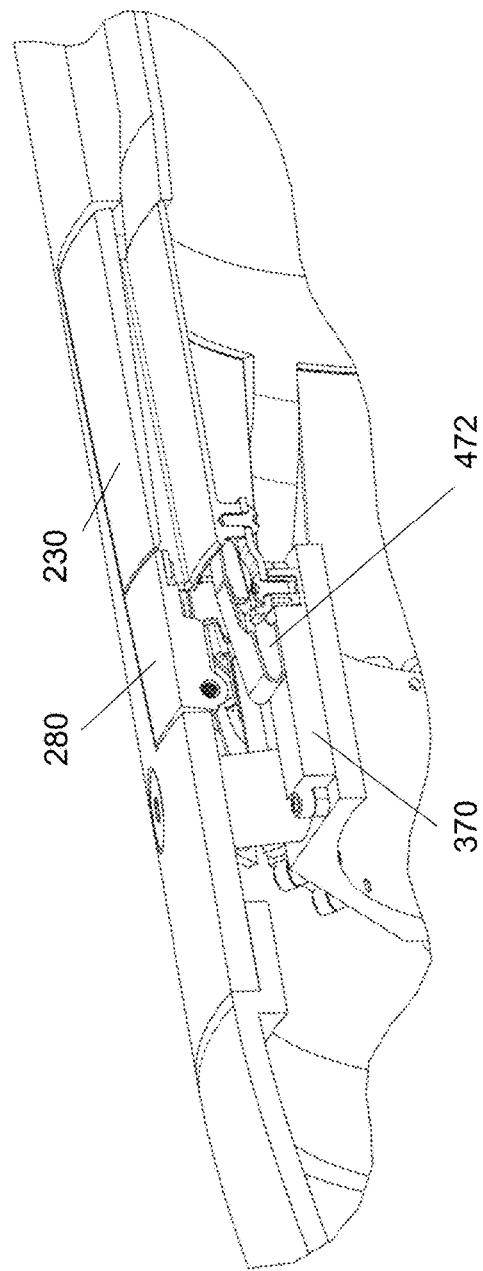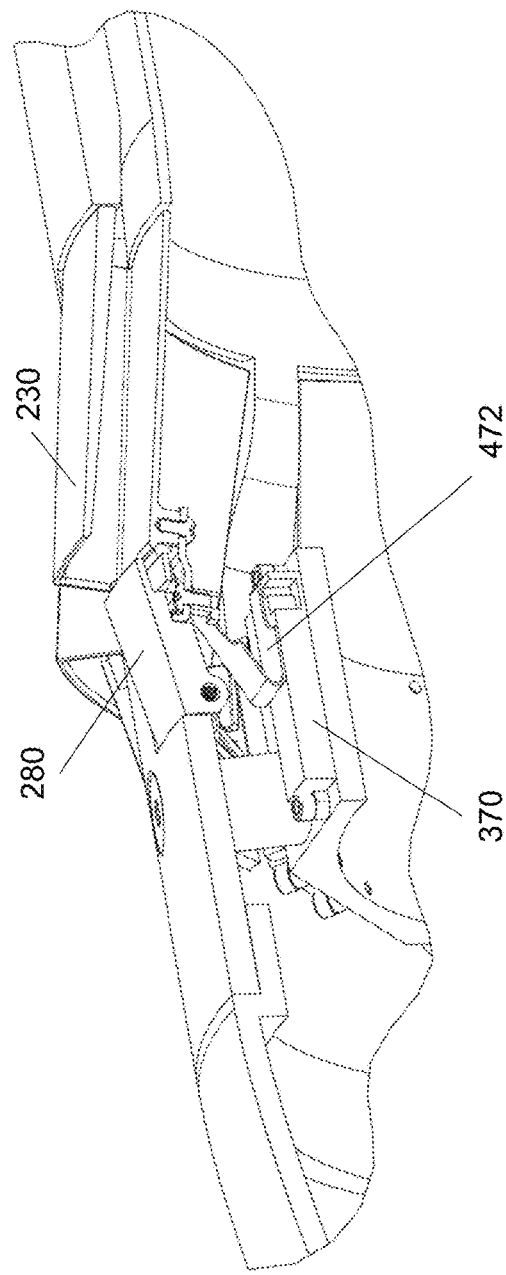

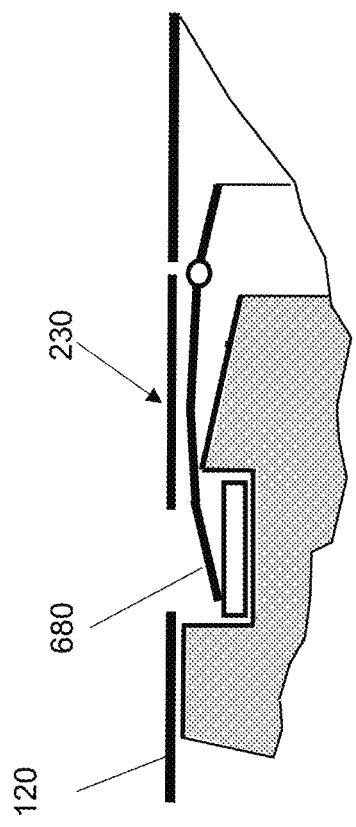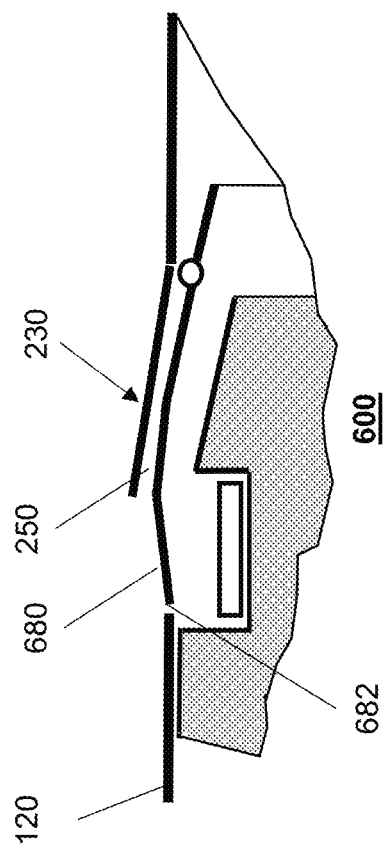

DEPLOYABLE INLET ASSEMBLY FOR AERIAL VEHICLE

TECHNICAL FIELD

This disclosure relates to aerial vehicles powered by air-breathing propulsion systems, and, more particularly, to inlet assemblies for reducing drag, increasing effective range, and enlarging payload bays.

BACKGROUND

In aerial vehicles powered by air-breathing propulsion systems, an inlet normally provided at a forward portion of the aerial vehicle supplies air to the propulsion system. In many instances, such as missile and munition applications, the inlet is not in use for a large portion of the flight path as the propulsion system is not engaged. However, the inlet still contributes to the aerodynamic drag acting on the aerial vehicle. Inlets can clutter the useful volume of the aerial vehicle, can be incompatible with some aerial vehicles such as artillery or missiles, or can require large launch devices for tube-launched missiles.

SUMMARY

This disclosure provides an aerial vehicle including a housing, a propulsion system supported within the housing, and an inlet assembly supported by an outer surface of the housing. The inlet assembly includes at least one fluid channel in fluid communication with the propulsion system and a first scoop pivotably coupled to the housing and movable between a stowed position and a deployed position. The first scoop is aligned with the housing in the stowed position to prevent air from entering the propulsion system. The first scoop projects from the outer surface of the housing in the deployed position to direct air through the at least one fluid channel and into the propulsion system to generate thrust. The inlet assembly also includes a flap disposed upstream of the first scoop, the flap moveable between a flap stowed position and a flap deployed position.

In aspects, the aerial vehicle may include an inlet actuator operably coupled to the first scoop and configured to maintain the first scoop in the stowed position and selectively release the first scoop to enable the first scoop to transition to the deployed position.

In aspects, the inlet actuator may further include a biasing member configured to urge and maintain the first scoop in the deployed position.

In aspects, the inlet actuator may further include a driving motor mechanically coupled to the first scoop via a lever.

In aspects, the aerial vehicle may further include a driver operably coupling the driving motor to the lever coupled to the first scoop.

In aspects, the aerial vehicle may include a processor and a memory having instructions stored thereon. The instructions, when executed by the processor, cause the inlet actuator to release the first scoop.

In aspects, the instructions, when executed by the processor, may further cause the inlet actuator to selectively transition the first scoop from the deployed to position to the stowed position.

In aspects, the flap may be operably coupled to the housing via a flap hinge.

In aspects, the first scoop may include a compression ramp.

In aspects, the inlet assembly may further include a plurality of scoops, the plurality of scoops including the first scoop, where each scoop of the plurality of scoops is circumferentially arranged about the housing.

In aspects, when the first scoop is in the deployed position and the flap is in the flap deployed position, an aftmost portion of the flap may be adjacent a forwardmost portion of the scoop such that an obtuse angle may be formed.

This disclosure also provides an inlet assembly for an aerial vehicle having an air-breathing propulsion system. The inlet assembly includes a first flap pivotably coupled to a housing of the aerial vehicle and a first scoop pivotably coupled to the housing aft of the first flap. The first scoop is configured to direct air into the air-breathing propulsion system. An inlet actuator is configured to transition the first flap and the first scoop between a stowed position and a deployed position. When the first flap and the first scoop are in the deployed position, the first flap and the first scoop are configured to compress the air flowing into the scoop. When the first flap and the first scoop are in the stowed position, the first flap and an outer surface of the first scoop are in registration with or below the housing.

In aspects, the inlet actuator may include at least one of: a passive deployment release mechanism, a pop-up actuator, or a driving mechanism.

In aspects, the housing may define a first volume configured to house at least one of a propellant or a payload. The first volume may fill an inside diameter of the housing from a nose of the housing to about the first flap and/or the first scoop.

In aspects, the inlet assembly may include a plurality of flaps and a plurality of scoops, the plurality of flaps includes the first flap, and the plurality of scoops includes the first scoop.

In aspects, the inlet actuator may include a driving motor and a driver, the driver operably coupled to the plurality of flaps and the plurality of scoops to enable each flap and each scoop to transition between the deployed position and the stowed position.

In aspects, the inlet assembly may include a controller configured to operate the inlet actuator to cause the inlet actuator to selectively release the first flap and the first scoop.

In aspects, the inlet actuator is a spool initiator having a fuse and a fastener configured to retain at least one of the first flap or the first scoop in the deployed position. The spool initiator may be configured to receive an electric signal that burns the fuse to release the fastener to enable the first flap and the first scoop to transition to the deployed position.

This disclosure also provides a method for operating an inlet assembly of an aerial vehicle having a housing supporting an air-breathing propulsion system. The method includes maintaining the scoop and the flap in a stowed position where the scoop and the flap are aligned with the housing to prevent air from entering the propulsion system. The method includes enabling, via an inlet actuator, the scoop and the flap to transition to a deployed position. The method includes transitioning the scoop and the flap from the stowed position to the deployed position where the scoop and the flap project from the outer surface of the housing. The method includes directing air over the flap and through the scoop into a fluid channel in fluid communication with the scoop and the air-breathing propulsion system.

In aspects, the method may include transitioning, via the inlet actuator, the scoop and the flap from the deployed position to the stowed position.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which:

FIG. 3A is a perspective, cross-sectional view of another air-breathing aerial vehicle in accordance with another aspect of this disclosure;

FIG. 3B is another perspective, cross-sectional view of the air breathing aerial vehicle of FIG. 3A with the inlet assembly in a stowed position;

FIG. 3C is a further perspective, cross-sectional view of the air breathing aerial vehicle of FIG. 3A with the inlet assembly in a deployed position;

FIG. 4B is another perspective, cross-sectional view of the air breathing aerial vehicle of FIG. 4A with the inlet assembly in a stowed position;

FIG. 4C is a further perspective, cross-sectional view of the air breathing aerial vehicle of FIG. 4A with the inlet assembly in a deployed position;

FIGS. 6A and 6B are cross-sectional views illustrating another inlet assembly of an air-breathing aerial vehicle in stowed and deployed positions.

DETAILED DESCRIPTION

Figure 1:
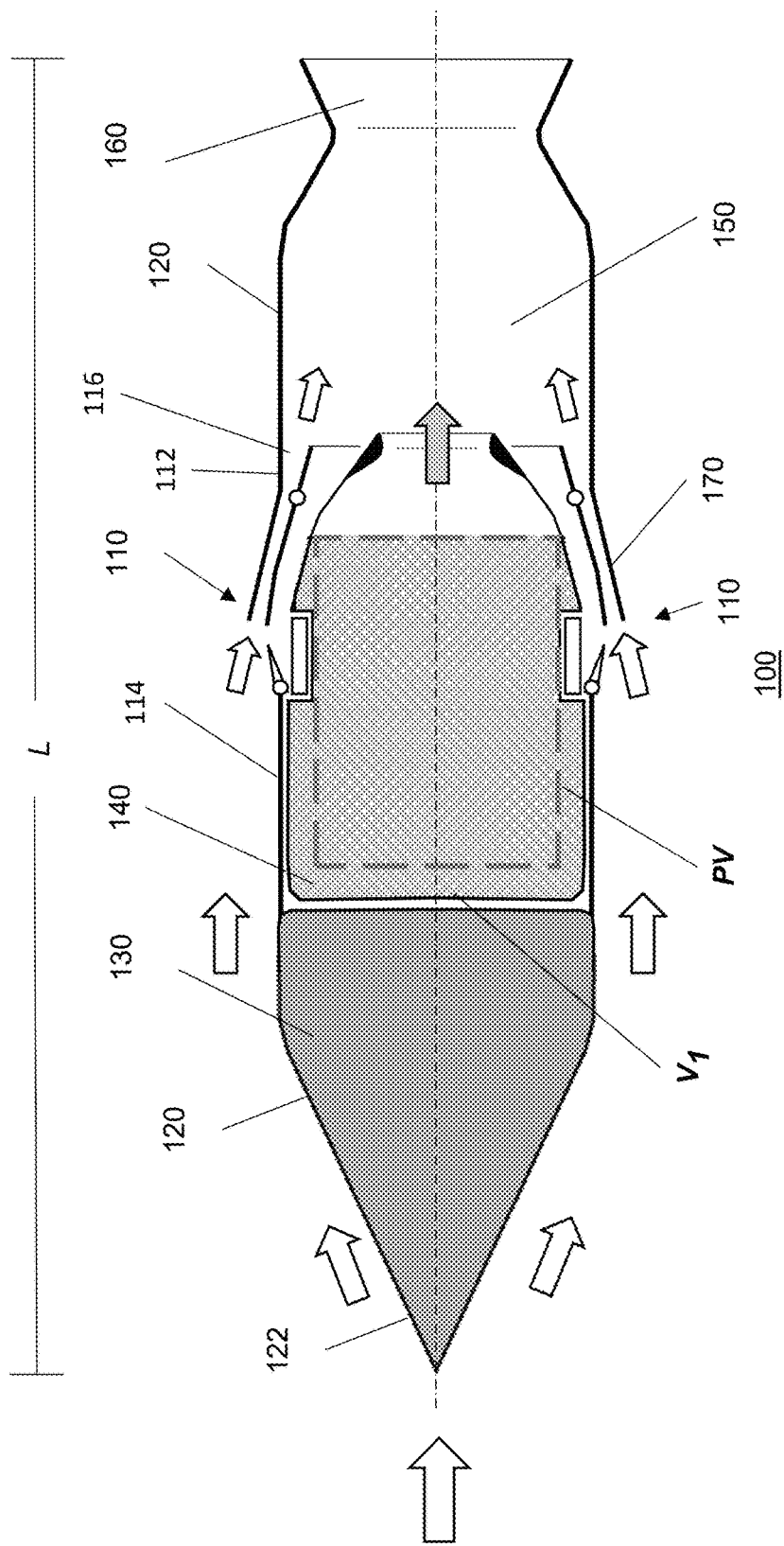
FIG. 1 is a diagram illustrating airflow across an air-breathing aerial vehicle in accordance with an aspect of this disclosure.

Aspects of the presently disclosed inlet assembly for an aerial vehicle are described in detail with reference to the drawings, in which like reference numerals designate identical or corresponding elements in each of the several views.

Although this disclosure will be described in terms of specific aspects, it will be readily apparent to those skilled in this art that various modifications, rearrangements, and substitutions may be made without departing from the spirit of this disclosure.

As used herein, the term "forward" refers to an upstream portion of an aerial vehicle (e.g., a missile, projectile, aircraft engine, and the like) and the term "aft" refers to a downstream portion of the aerial vehicle.

As used herein, the term "about" means that the numerical value is approximate and small variations would not significantly affect the practice of the disclosed aspects of this disclosure. Where a numerical limitation is used, unless indicated otherwise by the context, "about" means the numerical value can vary by ±15% and remain within the scope of the disclosed aspects of this disclosure.

This disclosure provides an inlet assembly for aerial vehicles (AV) with air-breathing propulsion systems. The inlet assembly is selectively deployable into an air stream flowing around the AV to provide air to the air-breathing propulsion system. The inlet assembly is selectively removable from the air stream, such as, for example, after the air-breathing propulsion system shuts down or consumes all available fuel, thereby reducing aerodynamic drag caused by the deployment of the inlet assembly.

With reference to FIG. 1, an aerial vehicle 100 includes a housing 120 supporting an inlet assembly 110, a propulsion system 150 supported within the housing 120, and a convergent-divergent ("CD") nozzle 160 extending from the housing 120. The inlet assembly 110 is supported by the housing 120 in an intermediate portion of the housing 120. For example, the inlet assembly 110 may be supported anywhere between about a third (about 33%) of a length L of the housing 120 relative to a forward most end to about two-thirds (about 66%) of the length of the housing 120 relative to the forward most end. In aspects, the inlet assembly 110 may be disposed in the final third of the length of the housing 120 relative to the forward most end. The housing 120 defines a downstream housing segment 112 aft of the inlet assembly 110 and the housing 120 defines an upstream housing segment 114 forward of the inlet assembly 110. The inlet assembly 110 includes a first fluid channel 250 and the downstream housing segment 112 defines an aerodynamically contoured second fluid channel 116.

The housing 120 is configured to house a payload 130 and support a propellant 140 for operating a combustor of the propulsion system 150. The CD nozzle 160 is disposed on and extends from an aft end portion of the housing 120. The inlet assembly 110 is configured to be actuated between a stowed position, wherein air flows over the housing 120 and the inlet assembly 110, and a deployed position, wherein the inlet assembly 110 directs air to the propulsion system 150.

The propellant 140 supported in the housing 120 may be a solid fuel and/or a liquid fuel propellant to be combusted or burned by the propulsion system 150 to generate thrust. For example, the propellant 140 may be in the form of hot fuel-rich gas generated from a mixture of a solid oxidizer and a solid fuel into a solid propellant (via a gas generator). Air supplied by the inlet assembly 110 may be mixed with the propellant 140 to cause the hot fuel-rich gas to combust.

The propulsion system 150 of the aerial vehicle 100 can be any engine configured to generate thrust or propulsion. The propulsion system 150 may be provided in the form of a ducted rocket (e.g., an air-augmented rocket including a convergent-divergent nozzle) as illustrated in FIG. 1. The propulsion system 150 may include a combustion chamber and/or a gas generator, such as those disclosed in U.S. patent application Ser. No. 17/339,208 by Balepin et al., filed Jun. 4, 2021, the entire contents of which are herein incorporated by reference. The propulsion system 150 may be a rotating detonation engine or a gas generator rotating detonation engine. Any propulsion system 150 including ramjet propulsion systems known by those of ordinary skill in the art may be used as the propulsion system 150.

Advantageously, the aerial vehicle 100 can carry more payload 130 and propellant 140 than aerial vehicles including forward air channels that cause air to flow into a forward portion of a housing and through the housing to the propulsion system. For example, the aerial vehicle 100 with the inlet assembly 110 may carry up to 40% more propellant 140 with the same payload 130 than such aerial vehicles having a similar housing that includes forward air channels which must be accommodated by space defined by the housing of such aerial vehicles, as the forward air channels extend from the forward most portion of such aerial vehicles to an aftmost portion of such aerial vehicles. By removing the forward air channels that extend from a forward portion to the propulsion system, a useable volume of the housing 120 is increased. The housing 120 defines a first volume Vi configured to house the propellant 140 and/or the payload 130. The inlet assembly 110 is configured to enable the first volume Vi to define more useable space (e.g., up to about 40% additional useable space) versus a volume of the prior art PV since first volume Vi does not need to accommodate forward air channels extending along the housing 120. The housing 120 may define a first volume Vi that fills an inside diameter of the housing from a nose of the housing to about the flap 280 or the scoop 230. The first volume Vi thus is configured to continuously and/or uninterruptedly house the payload 130 and the propellant 140 from the nose 122 of the housing 120 to about the flap 280 or the scoop 230.

The additional useable space may be used to carry more propellant 140, more payload 130 (e.g., munitions), or eliminated completely by reducing size of the aerial vehicle 100 otherwise required to carry the same payload 130 or propellant 140. For example, the diameter of the payload 130 may be increased, thereby reducing its length while preserving total volume of the payload. In a further non-limiting aspect of the previous example, the length of a propellant grain of propellant 140 may be increased due to a decrease in the length of the payload or the diameter of the propellant 140 may be increased (since there are no forward air channels extending to the rear of the aerial vehicle 100).

Figure 2A:
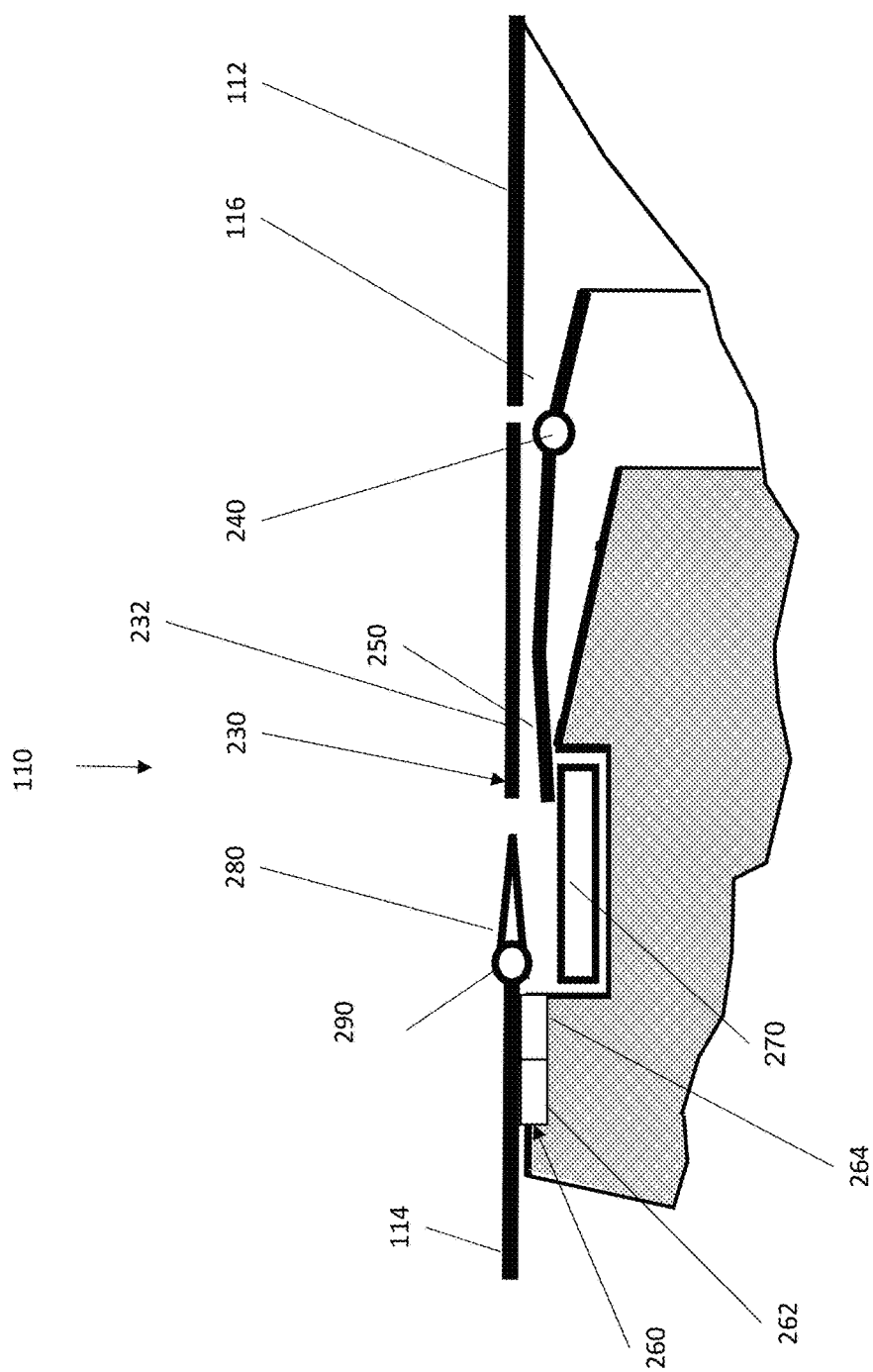
FIG. 2A is a cross-sectional view illustrating an inlet assembly of the air-breathing aerial vehicle of FIG. 1 in a stowed position.
Figure 2B:
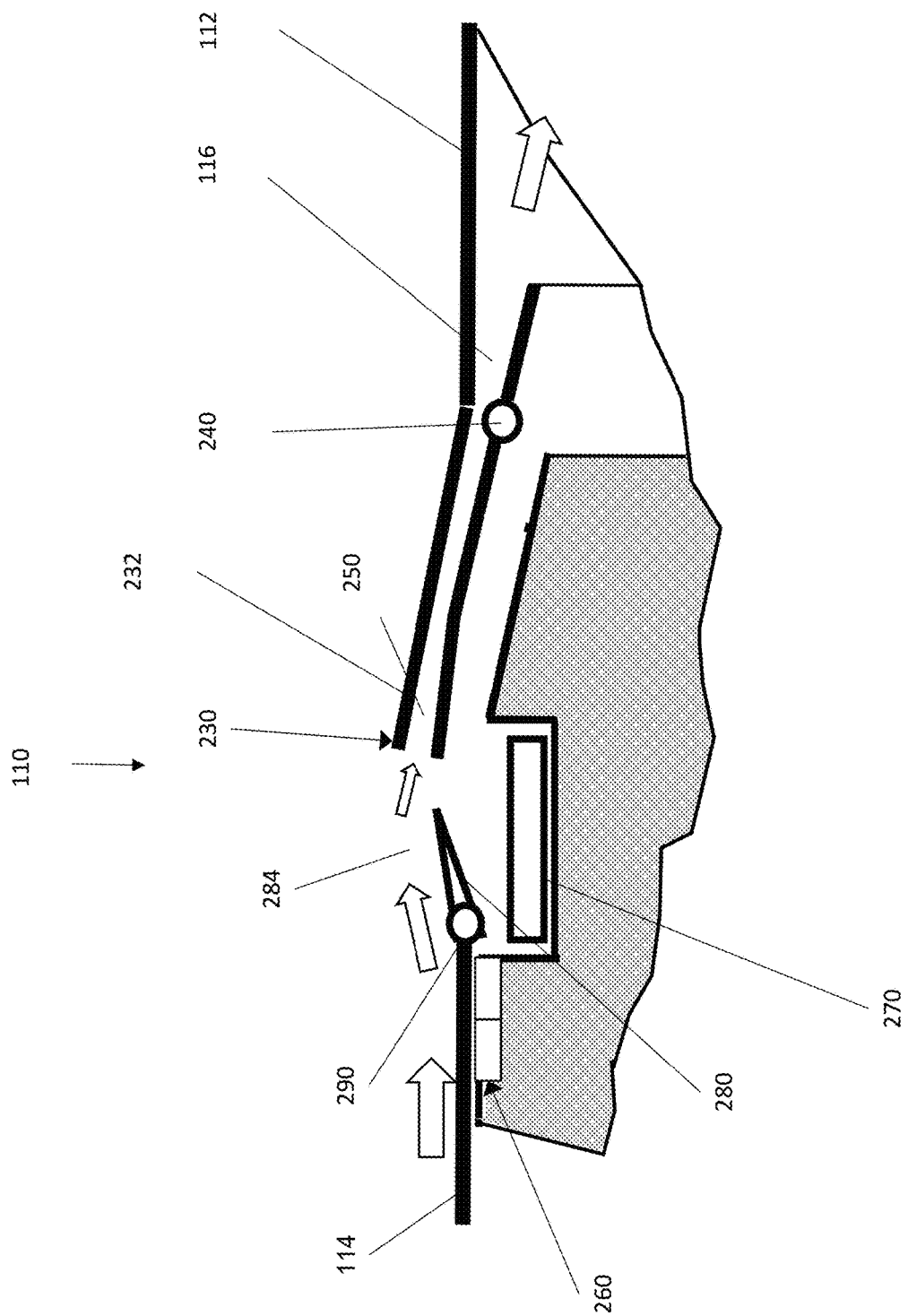
FIG. 2B is a cross-sectional view illustrating the inlet assembly of FIG. 2A in a deployed position.
Figure 2C:
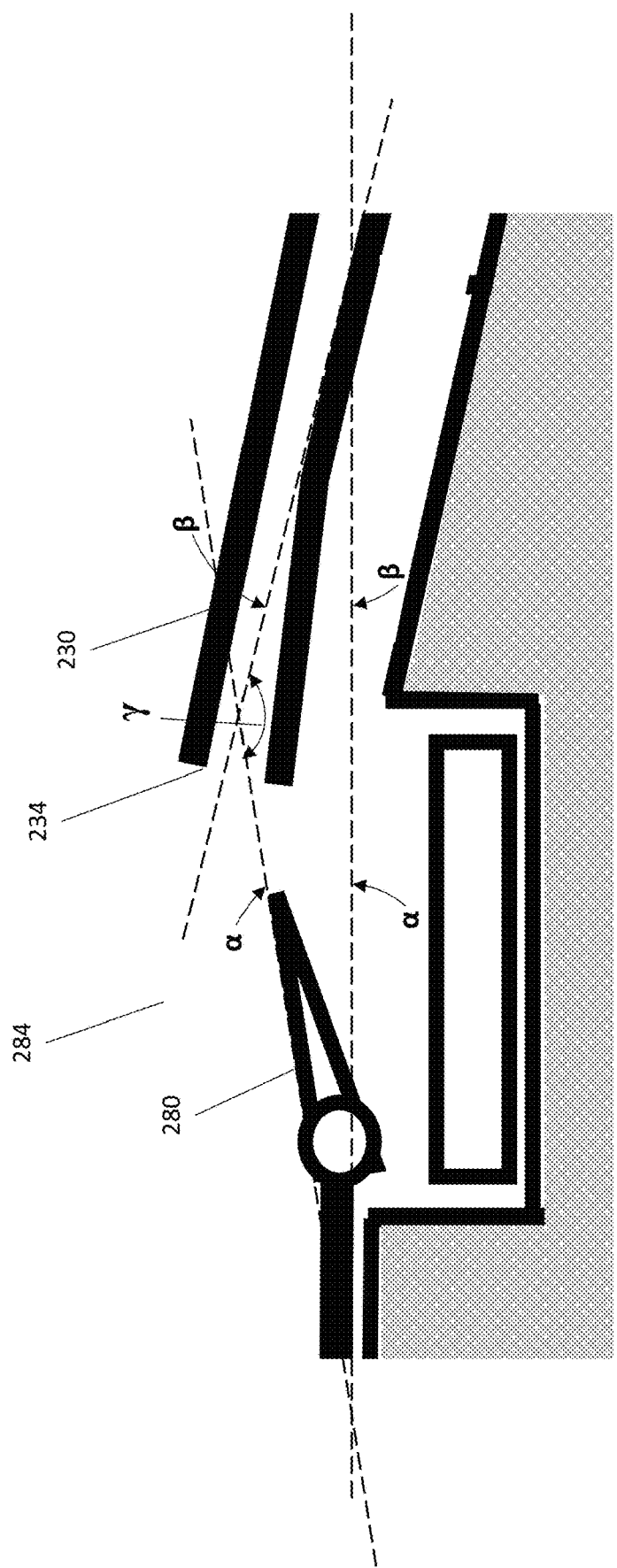
FIG. 2C is a detailed view of the inlet assembly shown in FIG. 2B.

With additional reference to FIGS. 2A-C, the inlet assembly 110 of the aerial vehicle 100 includes a scoop 230 coupled to the downstream housing segment 112 of the housing 120 via a hinge 240. The scoop 230 defines the aerodynamically contoured first fluid channel 250 which is in fluid communication with the aerodynamically contoured second fluid channel 116 defined in the downstream housing segment 112 of the housing 120. The scoop 230 is configured to direct air from the air stream flowing over the housing 120 into the propulsion system 150 via the first and second fluid channels 250, 116.

The inlet assembly 110 of the aerial vehicle 100 also includes an inlet actuator 270 configured to enable the scoop 230 to operably transition the inlet assembly 110 between the stowed position and the deployed position. A flap 280 is supported by the housing 120 upstream of the scoop 230 and is attached to the upstream housing segment 114 of the housing 120 via a hinge 290. The flap 280 may be a contoured plate. The flap 280 is also actuatable between a stowed position and a deployed position. The flap 280 is configured as a compression ramp that compresses air flowing thereover and directs the air up into the scoop 230. The flap 280 and the scoop 230, when in the deployed position, form a narrowing fluid compression channel 284 with its largest cross-sectional area at the forwardmost portion of the flap 280 and narrowing to its smallest cross-sectional area into and through the first fluid channel 250, such that, as air flows over the flap 280 and into the first fluid channel 250, the air continually compresses as the fluid compression channel 284 constricts.

When the inlet assembly 110 of the aerial vehicle 100 is in the stowed position, an outer wall 232 of the scoop 230 and the flap 280 are in registration with (e.g., aligned with, approximately flush with, and/or 'submerged' relative to) the outer surface of the upstream and downstream housing segments 114, 112 of the housing 120. When the inlet assembly 110 is in the stowed position, the scoop 230 and the flap 280 are disposed so as to reduce the drag on the aerial vehicle 100 relative to when the inlet assembly 110 is in the deployed position. In aspects, the drag is reduced to the minimum aerodynamic drag of the aerial vehicle 100.

When the inlet assembly 110 of the aerial vehicle 100 is in the deployed position, the scoop 230 projects from the housing 120 to direct air into the propulsion system 150 via the first and second fluid channels 250, 116. When the inlet assembly 110 is in the deployed position, air flows over the flap 280 and is directed into the scoop 230 and into the first and second fluid channels 250, 116, where the air mixes with the propellant 140. The propellant 140 may be gasified and mixed with the air (e.g., if the propellant is a solid or liquid) or the propellant 140 may be injected into propulsion system 150 as a liquid and mixed with the air.

In the deployed position, the flap 280 forms a first angle $\alpha$ with the housing 120 and the scoop 230 forms a second angle $\beta$ with the housing 120. The first angle $\alpha$ may be between 10° and 20° and the second angle $\beta$ may be between 10° and 20°. The first and second angles $\alpha$ and $\beta$ are each less than 90°. In another example, the first angle $\alpha$ may be 45° and the second angle $\beta$ may be 45°. In yet another example, the first angle $\alpha$ may be 30° and the second angle $\beta$ may be 60°. The first and second angles $\alpha$ and $\beta$ may be of equal or different degrees. When the flap 280 and the scoop 230 are in the deployed position an aftmost portion of the flap 280 is adjacent the forwardmost portion of the scoop 230 such that a third angle $\gamma$ is formed. The first, second, and third angles $\alpha$, $\beta$, and $\gamma$, may form a triangle. In aspects, the third angle $\gamma$ is obtuse (e.g., 140°) and the first and second angles $\alpha$ and $\beta$ are acute (e.g., each 20°) such that air flows smoothly over the flap 280 and the scoop 230. For example, the first and second angles $\alpha$ and $\beta$ are acute such that there is no separation point in the air flow until after the air passes a leading edge 234 of the scoop 230 to reduce drag acting on the aerial vehicle 100.

The inlet actuator 270 transitions the scoop 230 and/or the flap 280 to the deployed position either before the propulsion system 150 is activated or initiated after launch to produce thrust or, if propulsion system 150 is intermittently activated or initiated throughout a flight path, before the propulsion system 150 is re-activated or re-initiated to produce thrust, as described in more detail below. If the propulsion system 150 is intermittently activated throughout a flight path, after or prior to each time propulsion system 150 is de-activated, the inlet actuator 270 transitions the scoop 230 and/or flap 280 to the deployed position. In aspects, the inlet actuator 270 transitions the scoop 230 and/or the flap 280 to the deployed position before the aerial vehicle 100 begins its flight path and transitions the scoop 230 and/or the flap 280 after the propulsion system 150 consumes all of the propellant 140.

The inlet assembly 110 may include a controller 260 that has a processor 262 and a memory 264. The memory 264 includes instructions stored thereon which, when executed by the processor, control actuation of the scoop 230 and/or the flap 280. The processor 262 and the memory 264 may be disposed in and supported by the housing 120. The instructions, when executed by the processor, may cause the inlet actuator 270 to release and deploy the scoop 230 and the flap 280. In aspects, the instructions can cause the inlet actuator 270 to selectively transition the scoop 230 from the deployed position to the stowed position, and vice versa.

In various aspects, the processor 262 may be any type of processor such as, without limitation, a digital signal processor, a microprocessor, general purpose microprocessors, an application specific integrated circuits (ASICs), a graphics processing unit (GPU), field-programmable gate array (FPGA), or a central processing unit (CPU).

In various embodiments, the memory 264 can be random access memory, read-only memory, magnetic disk memory, solid-state memory, optical disc memory, and/or another type of memory (e.g., RAM, ROM, EEPROM, flash memory, or the like). In various embodiments, the memory 264 can be separate from the controller 260 and can communicate with the processor 262 through communication buses of a circuit board and/or through communication cables such as serial ATA cables or other types of cables. The memory 264 includes computer-readable instructions that are executable by the processor to operate the inlet actuator 270. In various embodiments, the controller 260 may include a network interface to communicate with other computers or a server.

In aspects, as described above, the inlet actuator 270 of the inlet assembly 110 may actuate the scoop 230 and the flap 280 at various points along a flight path of the aerial vehicle 100. For example, the inlet actuator 270 may deploy the scoop 230 and the flap 280 at the beginning of a flight path of the aerial vehicle 100, stow the scoop 230 and/or the flap 280 after all or a portion of the propellant 140 has been consumed by the propulsion system 150, and/or re-deploy the scoop 230 and/or flap 280 at a later point in the flight path if there is further propellant 140 to be consumed to produce thrust. The scoop 230 and the flap 280 may be actuated to various degrees of deployment to control the amount of air flowing into the first and second fluid channels 250, 116.

By selectively deploying and stowing the inlet assembly 110 of the aerial vehicle 100, an aerodynamic drag force acting on the aerial vehicle 100 can be reduced for portions of the flight resulting in an increase in the flight range for a given amount of fuel. In aspects, the inlet assembly 110 enables the aerial vehicle 100 to carry and consume less fuel to achieve a similar flight distance compared to another aerial vehicle with a traditional inlet. The inlet assembly 110 eliminates or reduces this aerodynamic drag force and increases the effective flight distance of the aerial vehicle 100. Deploying the inlet assembly 110 post-launch of the aerial vehicle further enables performance benefits (e.g., reduction in drag and increase in effective flight distance) in gun-launched, air-launched, and tube-launched projectiles. Additionally, by providing the inlet assembly 110 and eliminating forward air inlets a nose 122 of the aerial vehicle 100 may be aerodynamically contoured and configured to reduce aerodynamic drag in a manner not possible when the nose 122 includes the forward air inlets of the prior art. Further, by providing the inlet assembly 110 there may be about a 1% to about a 70%, or at least about a 50% increase in flight range of the aerial vehicle 100.

Figure 2D:
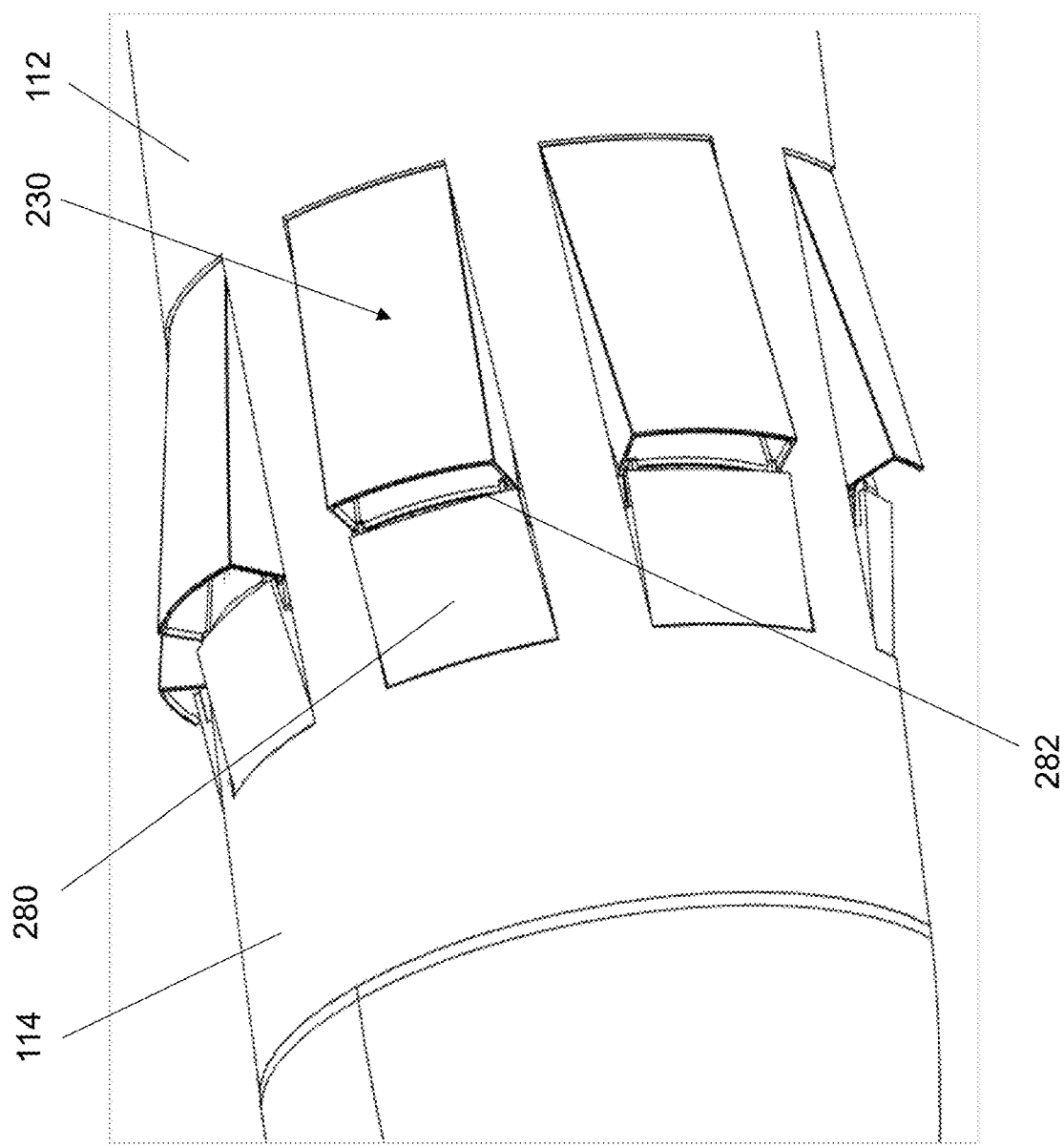
FIG. 2D is a perspective view of the aerial vehicle of FIG. 1 with a plurality of the inlet assemblies shown in FIGS. 2A-C.

With additional reference to FIG. 2D, the aerial vehicle 100 may include a plurality of inlet assemblies 110. The aerial vehicle 100 may contain between one and eight, or more, inlet assemblies 110 disposed about the housing 120. The plurality of inlet assemblies 110 may be evenly disposed about a circumference of the aerial vehicle 100. In aspects, the inlet assembly 110 may include a plurality of scoops 230 and a plurality of flaps 280, where each scoop 230 is paired with a respective flap 280 as described above.

The scoop 230 and the flap 280 of the inlet assembly 110 may be spaced apart to define a slot 282 therebetween. The slot 282 is configured to passively control a boundary layer of the air flowing over the flap 280 and into the scoop 230. The boundary layer includes higher pressure air flowing over the flap 280 which is bled down into the slot 282 and then around and between each scoop 230 externally of the aerial vehicle 100.

With reference to FIGS. 3A-C, another aerial vehicle 300 includes the inlet assembly 110 having the scoop 230, the flap 280, and an inlet actuator 370. The aerial vehicle 300 is similar to aerial vehicle 100 and for the sake of brevity, only the differences are discussed below.

The inlet actuator 370 of aerial vehicle 300 may be a passive deployment release mechanism configured to actuate the scoop 230 or the flap 280. The inlet actuator 370 may be a spool initiator (a split-spool initiator), a non-explosively actuated release mechanism, separation nut mechanism, cable release mechanism, pin puller, and/or a tension release mechanism known by those of ordinary skill in the art.

In aspects, the inlet actuator 370 is an electric spool initiator configured to maintain the scoop 230 and the flap 280 in the stowed position, via, for example, a fastener 372 (e.g., a hook, a magnet, a clip, a wire, etc.). The inlet actuator 370 may receive an electric signal that causes the inlet actuator 370 to release the scoop 230 and the flap 280. When the electric signal reaches the inlet actuator 370, the inlet actuator 370 is configured to release the fastener 372. The fastener 372 is attached to the scoop 230 and therefore when the inlet actuator 370 releases the fastener 372, the scoop 230 and the flap 280 move to the deployed position. After release, the scoop 230 and the flap 280 'passively' open under centrifugal force (for spin-stabilized aerial vehicles) and/or aerodynamic forces acting on the aerial vehicle 100. In aspects, the inlet actuator 370 may include a fuse or initiator that burns at an overcurrent condition and thus releases the scoop 230 when the fuse or initiator is consumed. The electric signal may generate an electric current that is equal to or greater than the overcurrent condition to burn the fuse. Alternatively, a fuse element can be coupled to scoop 230 or flap 280 and burned at an overcurrent condition (by passing a current through the fuse element) to break through the fuse element to release the scoop 230 or flap 280.

Figure 4A:
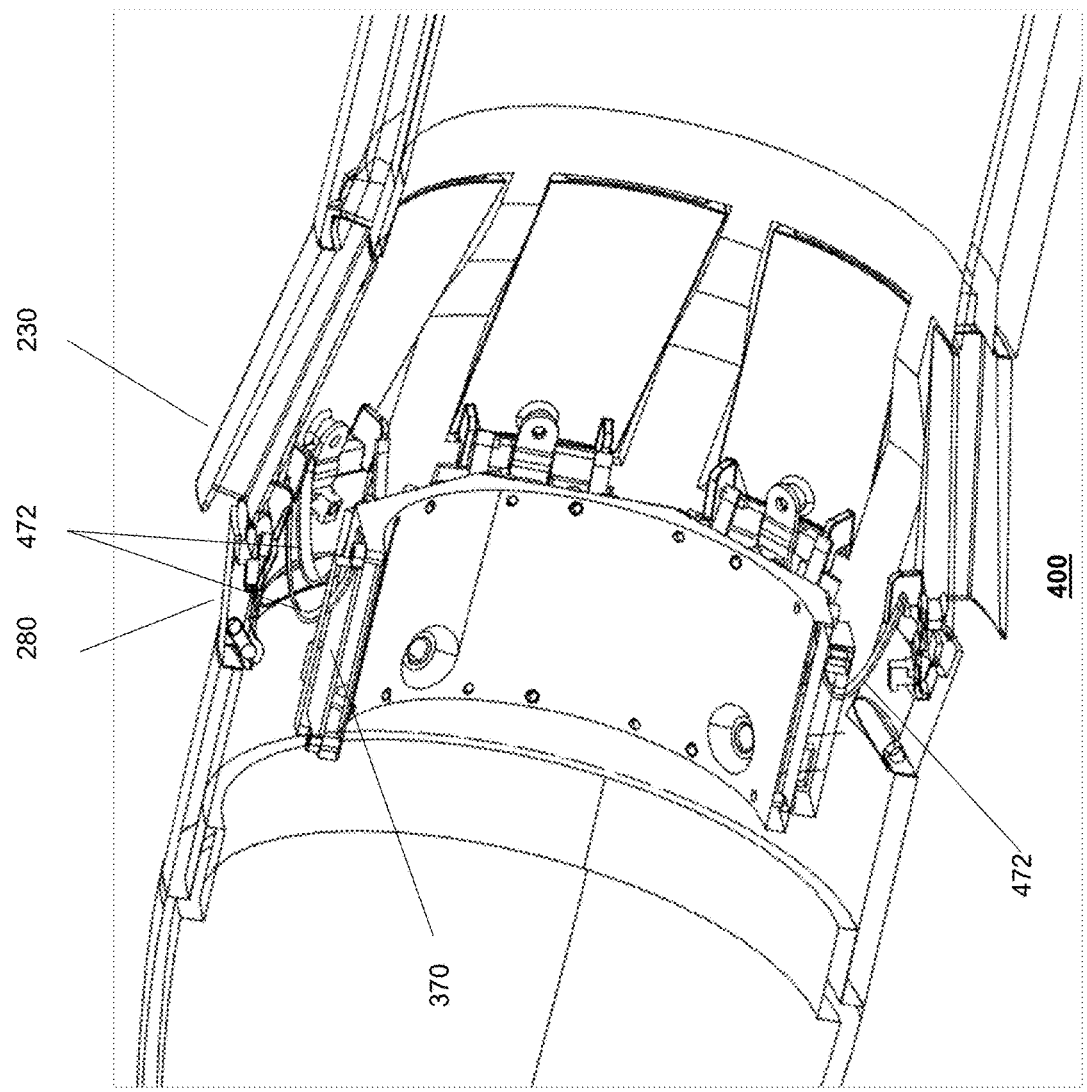
FIG. 4A is a perspective, cross-sectional view of yet another air-breathing aerial vehicle in accordance with yet another aspect of this disclosure.

With reference to FIG. 4, another aerial vehicle 400 includes the inlet assembly 110 having the scoop 230, the flap 280, and the inlet actuator 370 that further includes a biasing member 472. The aerial vehicle 400 is similar to aerial vehicles 100 and 300, and, for the sake of brevity, only the differences are discussed below.

The inlet actuator 370 (e.g., a passive deployment release mechanism) of aerial vehicle 400 further includes the biasing member 472 that is configured to urge the scoop 230 and the flap 280 to deploy. The biasing member 472 may be a leaf spring. When the inlet actuator 370 releases the scoop 230 and/or the flap 280, the biasing member 472 urges at least one of the scoop 230 or the flap 280 into the deployed position and holds the scoop 230 and/or the flap 280 in the deployed position. The biasing member 472 enables the scoop 230 and/or the flap 280 to be actuated to the deployed position irrespective of a centrifugal or aerodynamic force that may be acted on the aerial vehicle 400.

Figure 5A:
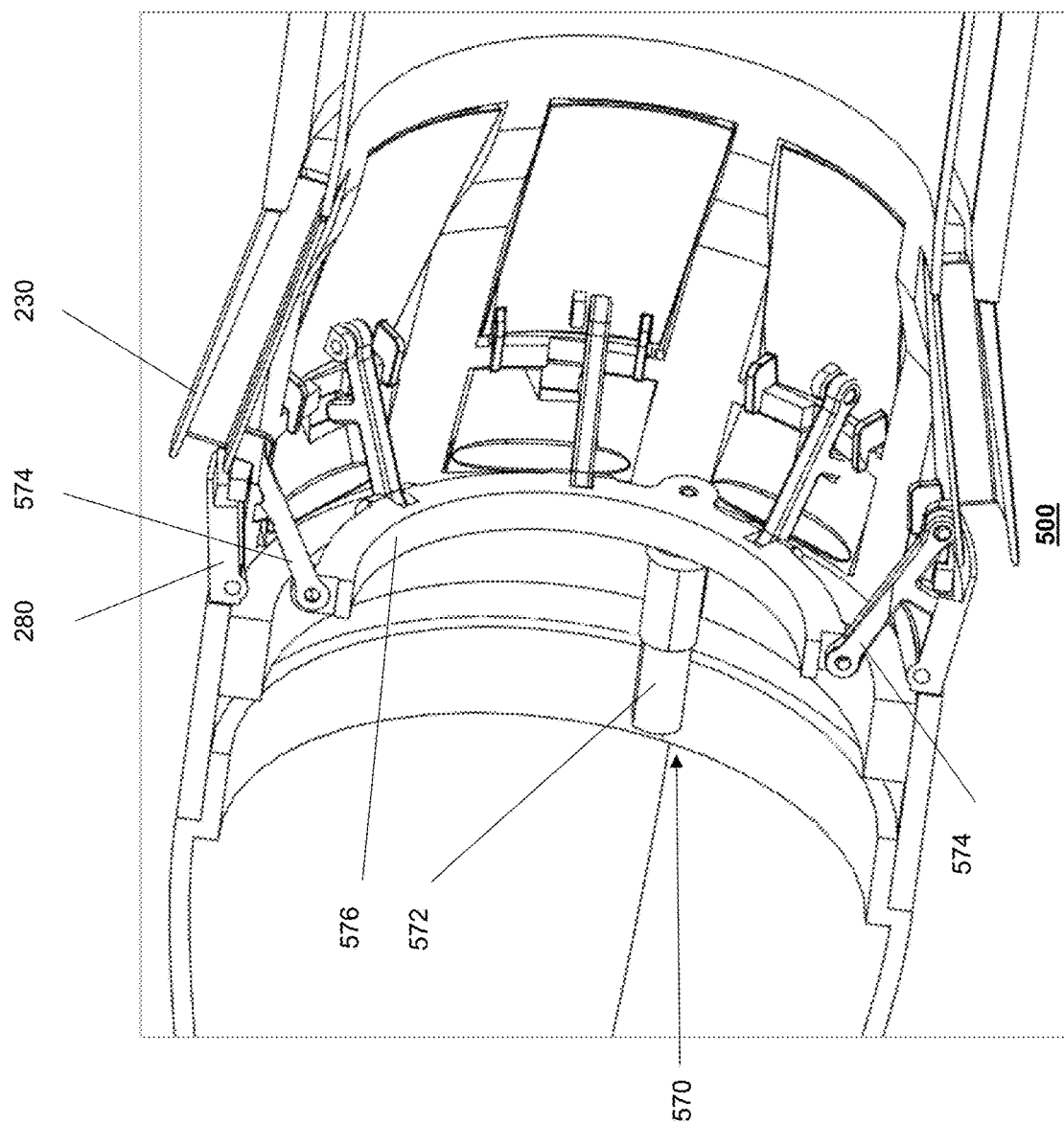
FIG. 5A is a perspective, cross-sectional view of still another air-breathing aerial vehicle in accordance with still another aspect of this disclosure.
Figure 5B:
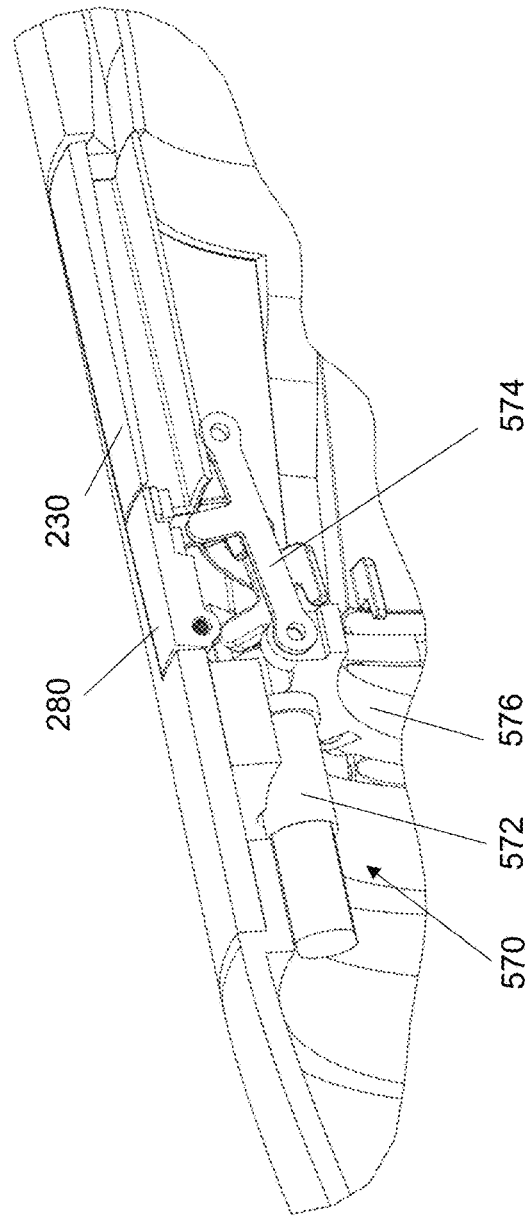
FIG. 5B is another perspective, cross-sectional view of the air breathing aerial vehicle of FIG. 5A with the inlet assembly in a stowed position.
Figure 5C:
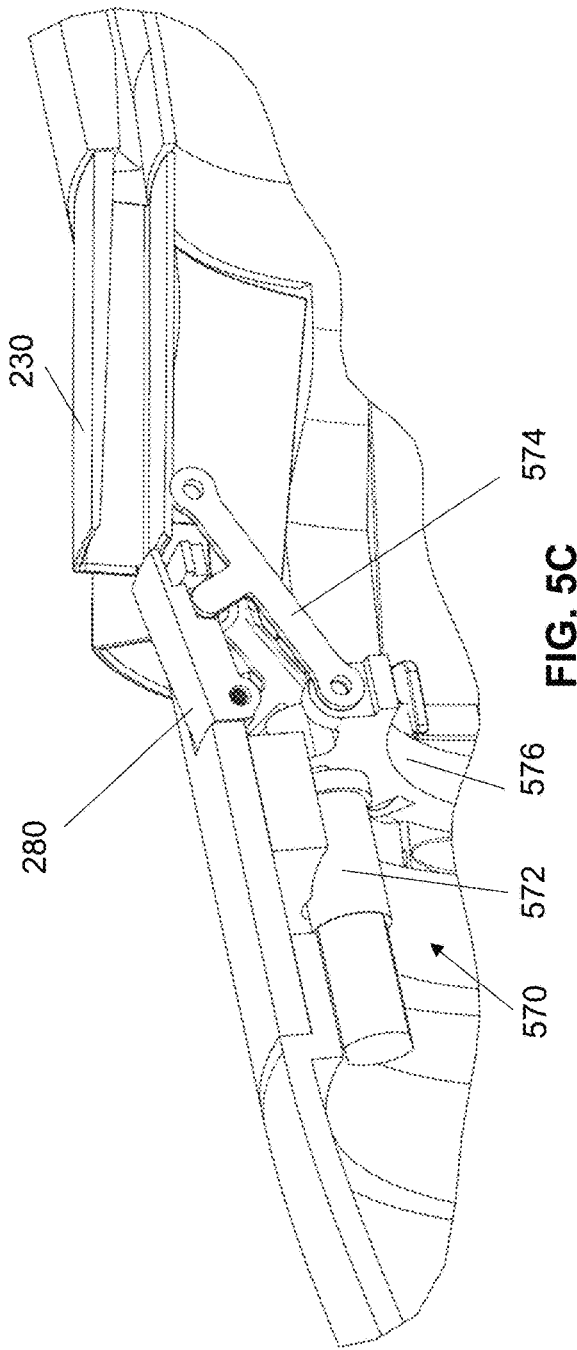
FIG. 5C is a further perspective, cross-sectional view of the air breathing aerial vehicle of FIG. 5A with the inlet assembly in a deployed position.

With reference to FIG. 5, still another aerial vehicle 500 includes the inlet assembly 110 having the scoop 230, the flap 280, and an inlet actuator 570. The aerial vehicle 500 is similar to the aerial vehicle 100, and, for the sake of brevity, only the differences are discussed below.

The inlet actuator 570 of aerial vehicle 500 is a driving mechanism 570 and includes a motor 572 and a lever 574 configured to actuate the scoop 230 and/or the flap 280 between the stowed position and the deployed position. In aspects, the motor 572 is directly connected to the lever 574. In aspects, aerial vehicle 500 includes a plurality of scoops 230, a plurality of flaps 280, a plurality of motors 572, and a plurality of levers 574 that together define a plurality of inlet assemblies. In aspects, there may be the same or different amounts of the motors 572, levers 574, scoops 230, and flaps 280. In other aspects, one or more motors 572 are connected to a driver 576 which is configured to push and/or pull all levers 574 approximately simultaneously, thereby actuating the plurality of scoops 230 and/or the plurality of flaps 280 between the stowed positions and the deployed positions. The driving mechanism 570 enables the scoop 230 and the flap 280 to be returned to the stowed position from the deployed position, for example, after all the propellant 140 (or after a predetermined portion thereof) is consumed by the propulsion system 150. By enabling the scoop 230 and the flap 280 to be returned to the stowed position, the aerodynamic drag acting on the aerial vehicle 500 may be reduced for the duration of the flight path, for a predetermined time, or until re-deployment of the scoop 230 and the flap 280 are desired.

With reference to FIGS. 6A-6B, yet another aerial vehicle 600 includes the inlet assembly 110 having the scoop 230, the flap 280, and any of the inlet actuators 270, 370, 470, or 570 and is similar to any of the above aerial vehicles 100, 300, 400, 500 and, therefore, only the differences between the aerial vehicle 600 and the aerial vehicles 100, 300, 400, 500 are discussed below.

The flap 280 of the aerial vehicle 600 is configured as a compression ramp 680 integrally formed with the scoop 230 and extends forward from the scoop 230. The compression ramp 680 enables further reduction of aerodynamic drag and therefore aerodynamic losses by eliminating the gap 282 (see FIG. 2B) formed between the scoop 230 and the flap 280 when the scoop 230 and the flap 280 are in the deployed position. When the compression ramp 680 and the scoop 230 are in the stowed position, the compression ramp 680 is disposed at or below the outer surface of the upstream and downstream housing segments 114, 112 of the housing 120, and the outer wall 232 of the scoop 230 is in registration with the outer surface of the upstream and downstream housing segments 114, 112. In the deployed position, a forwardmost tip 682 of the compression ramp 680 is approximately adjacent the upstream housing segment 114 and forms a ramp up to the first fluid channel 250 of the scoop 230. The configuration shown in FIGS. 6A and 6B also has the benefit of having fewer moving parts and reduced complexity. In aspects, an ejectable cover may be included that spans a gap between the compression ramp 680 and the scoop 230 when in the stowed position, the ejectable cover configured to be ejected or released from the aerial vehicle 600 when the compression ramp 680 and/or the scoop 230 are in the deployed position.

Figure 7:
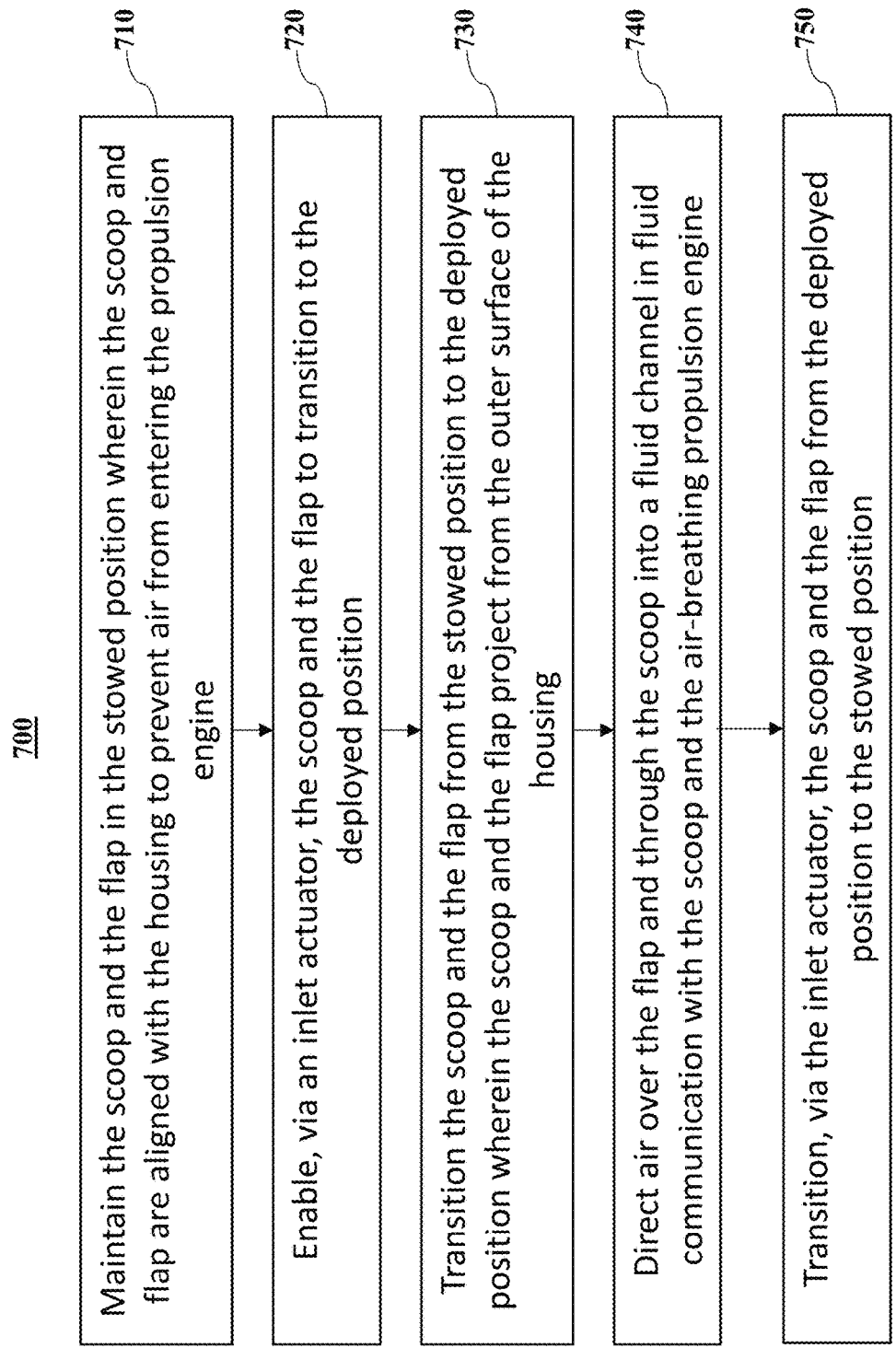
FIG. 7 is a diagram of a method of operating an inlet assembly in accordance with another aspect of this disclosure.

With reference to FIG. 7, a method 700 for operating an inlet assembly (e.g., inlet assembly 110) of this disclosure is shown and includes operations 710, 720, 730, 740, and/or 750. For simplicity, reference is made below to the inlet assembly 110 and components thereof. Although the operations of the method 700 of FIG. 7 are shown in a particular order, the operations need not all be performed in the specified order, and certain operations can be performed in another order or repeated. In various aspects, the operations of FIG. 7 may be performed in part by the controller 260 of FIGS. 2A-B and in part by another computing device, such as a remote server. These variations are contemplated to be within the scope of the present disclosure.

The operation 710 includes maintaining the scoop 230 and the flap 280 in the stowed position wherein the scoop 230 and flap 280 are aligned with the housing 120 to prevent air from entering the propulsion system 150. The operation 720 includes enabling, via the inlet actuator 270, the scoop 230 and the flap 280 to transition to the deployed position. The operation 730 includes transitioning the scoop 230 and the flap 280 from the stowed position to the deployed position wherein the scoop 230 and the flap 280 project from the outer surface of the housing 120. The operation 740 includes directing air over the flap 280 and through the scoop 230 into the second fluid channel 116 in fluid communication with the scoop 230 and the air-breathing propulsion system 150. The operation 750 includes transitioning, via the inlet actuator 270, the scoop 230 and the flap 280 from the deployed position to the stowed position. In aspects, operations 710, 720, 730, 740, and 750 may each be repeated along a flight path of the aerial vehicle 100.

The phrases "in an aspect," "in aspects," "in various aspects," "in some aspects," or "in other aspects" may each refer to one or more of the same or different aspects in accordance with this disclosure. A phrase in the form "A or B" means "(A), (B), or (A and B)." A phrase in the form "at least one of A, B, or C" means "(A); (B); (C); (A and B); (A and C); (B and C); or (A, B, and C)."

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that this disclosure is not limited to the precise aspects described, and that various other changes and modifications may be effectuated by one skilled in the art without departing from the scope or spirit of the disclosure. Additionally, the elements and features shown or described in connection with certain aspects may be combined with the elements and features of certain other aspects without departing from the scope of this disclosure, and that such modifications and variations are also included within the scope of this disclosure. Accordingly, the subject matter of this disclosure is not limited by what has been particularly shown and described.

What is claimed is:

1. An aerial vehicle comprising:
a housing defining a longitudinal axis;
a propulsion system supported within the housing; and
an inlet assembly supported by an outer surface of the housing and including:
  at least one fluid channel in fluid communication with the propulsion system;
  a first scoop pivotably coupled to the housing and axially fixed relative to the longitudinal axis, the first scoop having an upstream end and being movable between a stowed position and a deployed position, the first scoop being aligned with the housing in the stowed position to prevent air from entering the propulsion system, the first scoop projecting from the outer surface of the housing in the deployed position to direct air through the at least one fluid channel and into the propulsion system to generate thrust; and
  a flap having a downstream end disposed upstream of, and longitudinally spaced from, the upstream end of the first scoop when the first scoop is disposed in the stowed and deployed positions, the flap being moveable between a flap stowed position and a flap deployed position, the downstream end of the flap projecting outward from the outer surface of the housing in the flap deployed position.

2. The aerial vehicle of claim 1, further comprising an inlet actuator operably coupled to the first scoop and configured to maintain the first scoop in the stowed position and selectively release the first scoop to enable the first scoop to transition to the deployed position.

3. The aerial vehicle of claim 2, wherein the inlet actuator further includes a biasing member configured to urge and maintain the first scoop in the deployed position.

4. The aerial vehicle of claim 2, wherein the inlet actuator further includes a driving motor mechanically coupled to the first scoop via a lever.

5. The aerial vehicle of claim 4, further including a driver operably coupling the driving motor to the lever coupled to the first scoop.

6. The aerial vehicle of claim 2, further comprising a processor and a memory having instructions stored thereon, the instructions, when executed by the processor, cause the inlet actuator to release the first scoop.

7. The aerial vehicle of claim 6, wherein the instructions, when executed by the processor, further cause the inlet actuator to selectively transition the first scoop from the deployed position to the stowed position.

8. The aerial vehicle of claim 1, wherein the flap is operably coupled to the housing via a flap hinge.

9. The aerial vehicle of claim 1, wherein the first scoop includes a compression ramp.

10. The aerial vehicle of claim 1, wherein the inlet assembly further includes a plurality of scoops, the plurality of scoops including the first scoop, wherein each scoop of the plurality of scoops is circumferentially arranged about the housing.

11. The aerial vehicle of claim 1, wherein, when the first scoop is in the deployed position and the flap is in the flap deployed position, a forwardmost point of the flap and an aftmost point of the flap define a first line, and a pivot point of the scoop and a forwardmost point of the scoop define a second line such that an obtuse angle is formed between the first line and the second line.

12. An inlet assembly for an aerial vehicle having an air-breathing propulsion system, the inlet assembly comprising:
a first flap pivotably coupled to a housing of the aerial vehicle, the first flap having a downstream end;
a first scoop pivotably coupled to the housing about a hinge, the first scoop having an upstream end, the first scoop located aft of the first flap, the first scoop configured to direct air into the air-breathing propulsion system; and
an inlet actuator configured to transition the first flap and the first scoop between a stowed position and a deployed position,
wherein the downstream end of the first flap is longitudinally spaced from the upstream end of the first scoop when the first scoop is disposed in the stowed and deployed positions,
wherein, when the first flap and the first scoop are in the deployed position, the first flap and the first scoop are configured to compress the air flowing into the first scoop, by pivoting the downstream end of the first flap to project radially outward from the outer surface of the housing and by pivoting the upstream end of the first scoop to project radially outward from the outer surface of the housing, and
wherein, when the first flap and the first scoop are in the stowed position, the first flap and an outer surface of the first scoop are in registration with or below the housing.

13. The inlet assembly of claim 12, wherein the inlet actuator includes at least one of: a passive deployment release mechanism, a pop-up actuator, or a driving mechanism.

14. The inlet assembly of claim 12, wherein the housing defines a first volume configured to house at least one of a propellant or a payload, and wherein the first volume fills an inside diameter of the housing from a nose of the housing to about the first flap or the first scoop.

15. The inlet assembly of claim 12, further comprising a plurality of flaps and a plurality of scoops, the plurality of flaps including the first flap, and the plurality of scoops including the first scoop.

16. The inlet assembly of claim 15, wherein the inlet actuator includes a driving motor and a driver, the driver operably coupled to the plurality of flaps and the plurality of scoops to enable each flap and each scoop to transition between the deployed position and the stowed position.

17. The inlet assembly of claim 12, further comprising a controller configured to operate the inlet actuator to cause the inlet actuator to selectively release the first flap and the first scoop.

18. The inlet assembly of claim 12, wherein the inlet actuator is a spool initiator having a fuse and a fastener configured to retain at least one of the first flap or the first scoop in the deployed position, the spool initiator configured to receive an electric signal that burns the fuse to release the fastener to enable the first flap and the first scoop to transition to the deployed position.

19. A method for operating an inlet assembly of an aerial vehicle having a housing supporting an air-breathing propulsion system, the housing defining a longitudinal axis, the inlet assembly having a scoop and a flap each pivotably coupled to the housing and movable between a stowed position and a deployed position, the scoop having an upstream end, and the flap having a downstream end disposed upstream of, and longitudinally spaced from, the upstream end of the scoop when the scoop is disposed in the stowed and deployed positions, the method comprising:

maintaining the scoop and the flap in the stowed position wherein the scoop and the flap are aligned with the housing to prevent air from entering the propulsion system;

enabling, via an inlet actuator, the scoop and the flap to transition to the deployed position;

transitioning the scoop and the flap from the stowed position to the deployed position wherein the scoop and the flap project from the outer surface of the housing; and directing air over the flap and through the scoop into a fluid channel in fluid communication with the scoop and the air-breathing propulsion system.

20. The method of claim 19, further comprising transitioning, via the inlet actuator, the scoop and the flap from the deployed position to the stowed position.

* * * * *